United States Patent
Hayami

[11] Patent Number: 5,399,810
[45] Date of Patent: Mar. 21, 1995

[54] MEANS FOR COATING CONNECTING PORTIONS OF ELECTRICAL WIRES

[75] Inventor: Kazuo Hayami, Hachioji, Japan

[73] Assignee: Three Bond Co., Ltd., Tokyo, Japan

[21] Appl. No.: 203,479

[22] Filed: Feb. 28, 1994

Related U.S. Application Data

[63] Continuation-in-part of Ser. No. 970,834, Nov. 3, 1992, abandoned.

[51] Int. Cl.⁶ .......................... H02G 15/02; H01R 4/00
[52] U.S. Cl. ..................................... 174/84 R; 174/76; 174/87; 156/49
[58] Field of Search ............... 174/84 R, 87, 76, 92; 156/48, 49

[56] References Cited

U.S. PATENT DOCUMENTS

| | | | |
|---|---|---|---|
| 3,679,810 | 7/1972 | Nutt | 174/16.1 X |
| 4,392,014 | 7/1983 | Trumble et al. | 174/76 |
| 4,496,795 | 1/1985 | Konnik | 156/49 X |
| 4,839,473 | 6/1989 | Fox et al. | 174/87 X |
| 4,889,717 | 12/1989 | Covington et al. | 174/84 R |
| 5,099,088 | 3/1992 | Usami et al. | 174/76 |
| 5,140,746 | 8/1992 | Debbaut | 174/92 |

FOREIGN PATENT DOCUMENTS 984179  2/1965  United Kingdom .................. 174/92

Primary Examiner—Timothy V. Eley
Assistant Examiner—Khan V. Nguyen
Attorney, Agent, or Firm—Oblon, Spivak, McClelland, Maier & Neustadt

[57] ABSTRACT

A sealing compound consisting of one-part liquid type moisture curing resin is covered airtightly with a permeable wall member forming a container, so as to harden together with the connecting portions of electric wires or the like by exposing the sealing compound to environmental moisture when inserting the connecting portions into the container.

5 Claims, 4 Drawing Sheets

MEANS FOR COATING CONNECTING PORTIONS OF ELECTRICAL WIRES

This application is a continuation-in-part of application Ser. No. 07/970,834, filed on Nov. 3, 1992, now abandoned.

BACKGROUND OF THE INVENTION

1. Field of the Invention

This invention relates to means for coating connecting portions or terminal portions of lead wires such as telephone cables and electrical wires, connecting portions in wire harnesses for an automobile, connecting portions between control consoles for electric equipments and lead wires, connecting portions between cables in various plants, connecting portions of optical fiber cables, connecting portions of pipes, or the like by use of a single liquid type moisture curing resin.

2. Description of the Prior Art

For instance, as the wire harnesses used in an automobile, there are a main harness, sound harness, engine harness, rear harness, door harness, instrument harness and so on. These wire harnesses are constituted by connecting various lead wires.

The connecting portions (engaging parts) in such a connection wire harness to be protected have been coated with various coating materials including an insulating vinyl tape, thermoplastic resins, heat-shrinkable tube and sticky gel material, in order to prevent bad influences of the infiltration of water or seawater which possibly corrode the wires, thereby causing connection failure or breaking of connection. The coating on the connecting portions has been fulfilled in the following manner.

① The insulating vinyl tape has been used as a coating material and wound around the connecting portions to be connected to each other.

In a case that the thermoplastic resin is used as a coating material,

② the resin is molded by extrusion and solidified along with the connecting portions to be connected, ③ the resin is formed in a sheet and subjected to thermocompression bonding with the connecting portions to be connected, and ④ molten thermoplastic resin is poured into a container in which the connecting portions to be connected are inserted, thereby to seal the connecting portions within the container.

⑤ In a case that the heat-shrinkable tube is used as a coating material, upon insertion of the connecting portions to be connected in the heat-shrinkable tube, the tube is heated at a prescribed temperature to be shrunk.

⑥ In a case that the sticky gel is used as a coating material, the connecting portions are inserted in a container filled with the sticky gel.

However, the above methods ①~⑥ for connecting the connecting portions entailed the disadvantages as follows.

When the vinyl tape is wound around the connecting portions to be connected to each other in the method ① noted above, the tape must be wound around the connecting portions while being applied with strong tension to the tape; otherwise air bubbles or air layers are confined in the winding of the tape, thereby making the sealing property worse. Besides, when winding of the tape is done by hand, the work of winding the tape requires labor and suffers productive and working inefficiencies.

The method ② in which the thermoplastic resin is used as a coating material necessitates an extrusion molding machine or other equipments results in a large overall size of the coating system. Moreover, the processing for practicing this method cannot be proceeded with until the molten thermoplastic resin is cooled to room temperature. According to the method ③, the sheet-like thermoplastic resin cannot be closely stuck on nor attain complete sealing of the connecting portions, resulting in the infiltration of water or the like into the sealing. In the method ④, since the molten resin is poured into the container and solidified with the connecting portions inserted in the container, there is a case that the connecting portions get out of place or snap in the container.

According to the method ⑤, the work of inserting the connecting portions into the tube becomes onerous, and the connecting portions cannot be steadily held in the tube. Furthermore, when the connecting portions are already spliced to each other, this method in which the connecting portions must be inserted into the tube is not adaptable, consequently to make the coating impossible by this method.

According to the method ⑥ using a gelatinous sealing compound which is weak in adhesive strength, the connecting portions retained by the solidified gelatinous sealing compound are easily bared due to strong tension exerted thereon. Thus, the gelatinous sealing compound has little effect of sealing the connecting portions.

The coating materials as noted above by and large do not possess the effect of complete waterproof. Thus, in a case of a car, for example, the wire harness has been arranged so as to hold the connecting portions in position inside the car in order to prevent the connecting portions from causing connection failure or being broken due to the infiltration of water or seawater into the connecting portions. However, this method of wiring requires a troublesome chore, increases the weight and size of the wire harness and calls for large space for accommodating the large-sized wire harness. Thus, the coating materials produced by the aforementioned method inevitably turn out to be expensive.

There has been proposed a method for sealing connecting portions of conductive wires by use of a photocurable resin, in U.S. Pat. No. 5,099,088 to Usami et al. The photocurable resin used in this prior art is contained in a light-shielding container. However, this conventional method calls for onerous work of exposing the resin to light or ultraviolet rays, when coating the connecting portions with the resin.

OBJECT OF THE INVENTION

This invention is made to eliminate the drawbacks suffered by the conventional coating means and its object is to provide coating means capable of coating the connecting portions of connection members such as electric wires with considerable ease and tightly sealing the connection members with excellent antiweatherability, stability in electrical characteristics and insulation properties without using a common coating tool.

SUMMARY OF THE INVENTION

To attain the object described above according to the present invention, there is provided a coating means for coating terminal portions of connection members to be connected or joined together. The coating means includes a plastic container which is formed of a moisture impermeable material, or in other words is incapable of allowing moisture to permeate therethrough. The plastic container includes a wall member having air passages in the form of one of vent holes, slits and mesh holes, with the wall member having an inner wall surface which is overlaid with a moisture-permeable nonwoven fabric, such that a filling chamber is defined within the container and moisturepermeable nonwoven fabric, within which a single liquid type moisture curing resin is provided, serving as a sealing compound. The container is enveloped by a moisture-proof film.

The single liquid type moisture curing resin can be provided in the form of a silicone resin, a urethane resin, or an epoxy resin, and silicone resin has been found to be particularly suitable.

BRIEF DESCRIPTION OF THE DRAWINGS

The other objects and features of the present invention will be hereinafter explained in detail with reference to the accompanying drawings, wherein.

DESCRIPTION OF THE PREFERRED EMBODIMENTS

Figure 1:
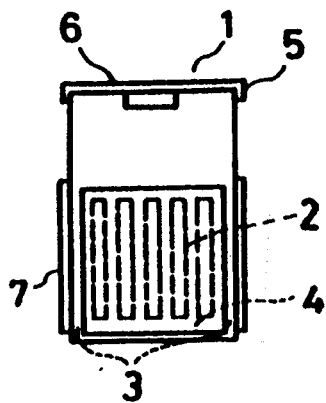
FIG. 1 is a longitudinal sectional side view showing one embodiment of coating means according to this invention.

The present invention will become more fully understood from the detailed description given hereinbelow and the accompanying drawings which are given by way of illustration only, and thus are not limitative of the present invention.

FIGS. 1 through 5 show preferred embodiments of the coating means each constituted by a container having an upper opening. Reference numeral 1 denotes the container made of polypropylene resin and having a plurality of vertical slits 2. This container in this embodiment is made from a transparent cylinder of 25 mm in outer diameter, 20 mm in inner diameter, and 55 mm in height. More than twenty of the vertical slits are arranged circumferentially in the container, which each have a width of 2 mm and extending from 4 mm to 35 mm from the bottom of the container.

The entire inner surface of the container 1 is overlaid with a moisture permeable film 3. The container having the inner surface overlaid with the permeable film 3 is filled with a sealing compound 4 of a single liquid type moisture curing resin. In this embodiment, a nonwoven fabric (trade name "H-8103" of Japan Vilene Co., Ltd.) is used as the permeable film 3.

An opening formed in the upper part of the container 1 is covered with a lid 5 of moisture-proof film. The lid 5 is provided on its inner side with a desiccant 6. The side of the container is wrapt with a moisture-proof film 7 to close the slits 2. In this embodiment, an aluminum-triplex lamination film is used as the moisture-proof film.

Figure 2:
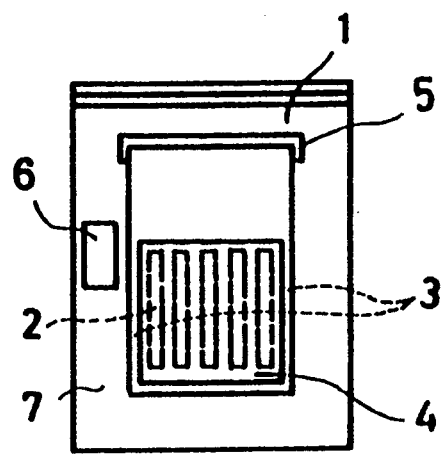
FIG. 2 is a side view showing the state in that the coating means of FIG. 1 is contained in a bag of moisture-proof film.
Figure 3:
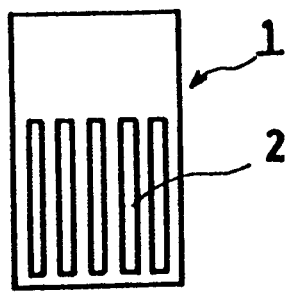
FIG. 3 is a side view showing the state in that the moisture-proof film is removed from the coating means of FIG. 1.
Figure 5:
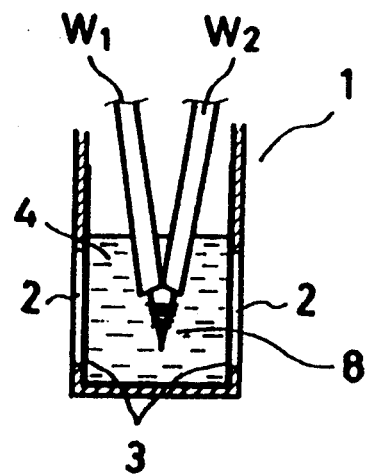
FIG. 5 is an explanatory view showing the manner in which the coating means is used for coating the connecting portions of the connection members.

Another embodiment shown in FIG. 2, the upper opening of a container 1 is tightly sealed with a lid 5 of polypropylene. Inside a bag 7 of moisture-proof film, the container 1 is contained together with a desiccant 6. The mouth of the bag 7 is sealed hermetically. The other components in this embodiment are identical with those in the embodiment shown in FIG. 1.

Figure 4:
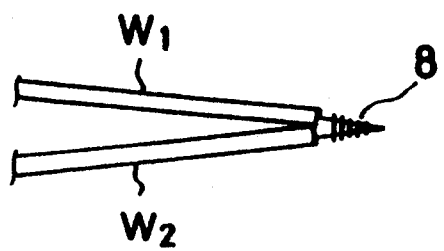
FIG. 4 is a plan view showing one example of the connecting portions of connection members to be joined.
Figure 6:
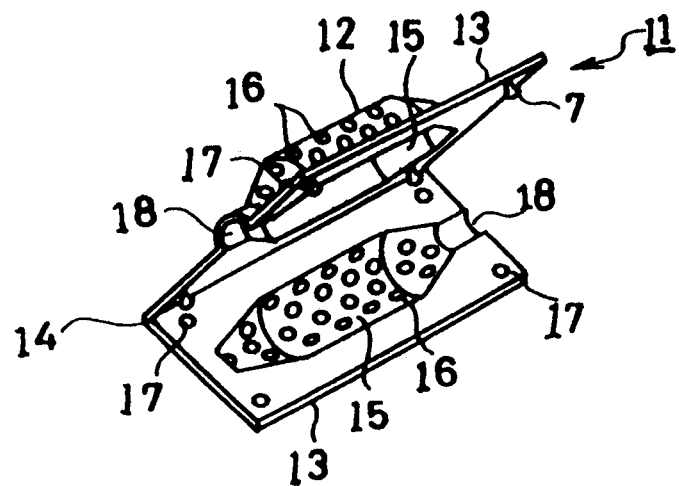
FIG. 6 is a perspective view showing another embodiment of the coating means of this invention.
Figure 8:
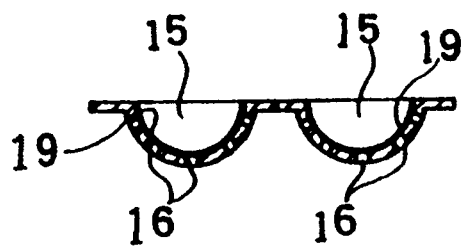
FIG. 8 is a sectional view of FIG. 6.
Figure 7:
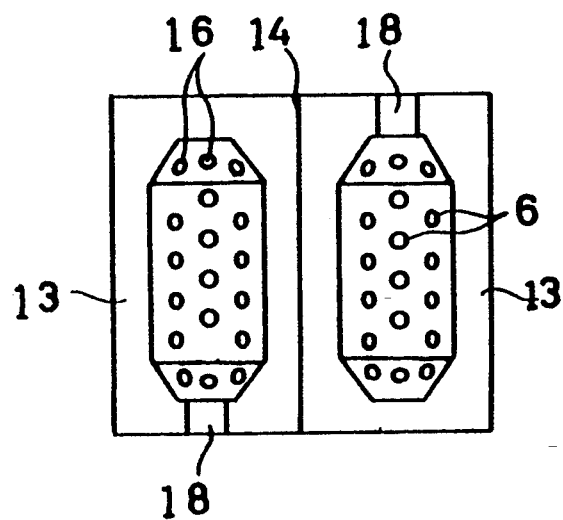
FIG. 7 is a plan view of FIG. 6.
Figure 9:
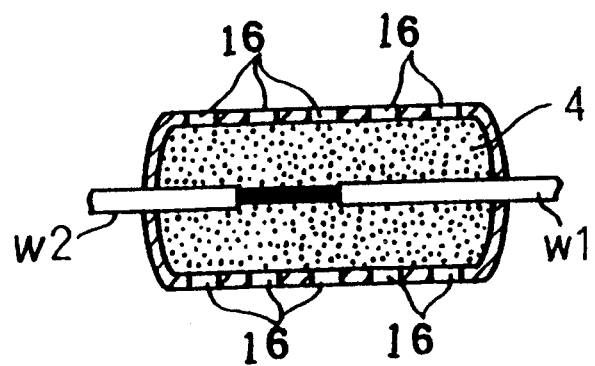
FIG. 9 is a longitudinal sectional side view showing the coating means of FIG. 6 in use.

Two lead wires W1 and W2 to be connected are treated so as to remove insulating coats to strip the wires and splice the stripped wires together to form a V-shaped spliced portion 8, as shown in FIG. 4 by way of example.

When the spliced portion 8 of the connection wire members is required to be coated, the sealing lid 5 is first taken off from the opening of the container 1, and then, the spliced portion 8 is thrust into the single liquid type moisture curing resin 4 filled in the container 1. Upon confirming that the spliced portion composed of the two lead wires W1 and W2 of the connection wire members is completely soaked in the single liquid type moisture curing resin 4, the moisture-proof film 7 covering the slits 2 formed in the side of the container 1 is removed.

In the case of containing the container 1 in the bag 7 of moisture-proof film as shown in FIG. 2, the same work as above is carried out after taking out the container 1 from the bag.

Upon completion of the aforesaid work, environmental moisture is permitted to enter into the container 1 through the opening and side slits 2, whereby the single liquid type moisture curing resin 4 reacts with the moisture within a certain period of time, consequently to harden strongly. As a result, the spliced portion 8 of the connection wire members are firmly sealed.

The container constituting the coating means is formed of, for example, a thermoplastic resin such as a nylon resin, polypropylene resin, and vinyl chloride resin, thermosetting resin, or moisture proof materials such as metal, wood and ceramics. In the wall of the container, there are formed a large number of air passages such as vent holes, slits extending circumferentially, slits extending longitudinally, and mesh holes.

In order to prevent the sealing compound filled in the container from leaking out through the aforenoted air passages, the inner wall of the container is overlaid with a moisture permeable film to cover the air passages.

The moisture permeable film can advantageously be formed of Goretex (trade name of Goretex Co.), or Microtex (trade name of Nitto Denko Corporation). If the sealing compound filled in the container is high in viscosity and thixotropy, the moisture permeable film may be made of paper, non-woven fabric, cloth and metal mesh. However, if a single liquid type moisture curing silicone resin is used as the sealing compound, the non-woven fabric is preferably used.

The coating means of this invention may be formed in any shape in accordance with the configuration of the connecting portions or terminals of the connection members to be joined. For instance, the coating means may be suitably shaped in a substantial bivalve shell, a cylinder or other possible shape, or provided with an upper opening capable of being closed with a sealing lid. In the case of forming the opening in the upper portion of the coating means, the opening in the coating means may be covered merely with a moisture-proof film.

On the other hand, if the single liquid type moisture curing resin serving as the sealing compound is filled in the coating means according to this invention, there is a possibility that the adhesive becomes hard and unavailable because of exposure to environmental moisture. Though the opening formed in the coating means is covered with the sealing lid to eliminate the above inconvenience, a plastic container formed of a material which does not allow moisture to permeate therethrough constituting the coating means may be entirely wrapped with the moisture-proof film.

As the moisture-proof film used here, there are an aluminum-laminated film, multi-layer polyethylene film, and so on.

Though the moisture-proof film may be used for closing the air passages in the side of the coating means and the other portions so as to be prevented from the infiltration of environmental moisture into the coating means, the coating means may be put in a bag made of moisture-proof film. In this case, it is desirable to use a desiccant such as silica gel and calcium chloride which have been commonly used.

Into the coating means according to the present invention, which is filled with a single liquid type room temperature-moisture curing resin serving as the sealing compound, the connecting portions or terminal portions of connection members to be joined are spliced and inserted in service. Since the environmental moisture is permitted to permeate the coating means through the air passages formed in the wall of the container constituting the coating means, the sealing compound of the single liquid type moisture curing resin gradually hardens with time at room temperature in normal moist air. As a result, the connecting portions or terminal portions of the connection members can be infallibly sealed with the hardened sealing compound.

When the coating means comprises a container having the upper opening covered with a sealing lid or a plastic container formed of a material which does not allow moisture to permeate therethrough wrapped with a moisture-proof film or contained in a bag of moisture-proof film, the sealing compound in the coating means never hardens as long as the coating means is covered with the sealing lid, moisture-proof film or the bag. Therefore, when the coating means is in service, the sealing lid or moisture-proof film is taken off from the coating means or the coating means is taken out from the bag of moisture-proof film, so that the connecting portions or terminal portions of the connection members to be connected can be inserted into the coating means, thereby to permit the sealing compound to harden along with the connecting portions or terminal portions in the same manner as above.

Furthermore, while the plastic container formed of a material which does not allow moisture to permeate therethrough has been described with reference to the provision of air passages in the wall of the plastic container, the container may also be formed of a moisture-permeable material such as paper, woven fabric, non-woven fabric, leather, wood, glass fiber, and porous synthetic resin.

Concrete cases in which the connecting portions of the connection members were actually coated by using the aforenoted coating means will be described below.

, EXAMPLE 1

After overlaying the entire inner surface of the container 1 with nonwoven fabric 3 as shown in FIG. 1, one-part liquid type silicone RTV (trade name "TB1222C" of THREE BOND CO., LTD) serving as the sealing compound of the single liquid type moisture curing resin was poured in the container to the depth of 35 mm from the bottom. Furthermore, the container was wrapped with an aluminum-triplex-lamination film to seal the side surface and the upper opening by hermetic sealing.

EXAMPLE 2

After overlaying the entire inner surface of the container 1 with nonwoven fabric 3 as shown in FIG. 2, one-part liquid type silicone RTV (trade name "TB1222C" of THREE BOND CO., LTD) serving as the sealing compound of the single liquid type moisture curing resin was poured in the container to the depth of 35 mm from the bottom. Furthermore, the upper opening of the container was covered with a lid of polypropylene, and the container was contained in a bag of the same aluminum-triplex-lamination film as in the Example 1. Finally, the mouth of the bag was hermetically sealed.

PREPARATION OF CONNECTION MEMBERS

Connection members to be connected to each other were prepared from lead wires (trade name "TR-64x10 type" of Sinagawa Electric Wire Co., Ltd.). The end portions of the lead wires were stripped by removing about 10 mm of polyvinyl chloride coat from each lead wire, and soldered thereby forming a V-shaped spliced portion as shown in FIG. 4.

Coating of Connecting Portions

In Example 1, upon removal of the moisture-proof film from the opening of the container, the aforementioned V-shaped spliced portion of the lead wires was thrust into the one-part liquid type moisture curing resin 4 in the container. After confirming that the spliced portion of the lead wires was completely soaked in the single liquid type moisture curing resin, the moisture-proof film covering the side surface of the container was removed.

In Example 2 after taking the container 1 out from the bag of moisture-proof film and taking the lid off, the same work as above was carried out.

Upon confirming that the sealing compound become completely hard after leaving the coating means at room temperature in normal moist air (25° C., 60% RH) for seven days, the insulation and sealing tests were performed in the following manner.

Insulation and Sealing Tests

After the following environmental tests were conducted, the leak tests were performed to verify the excellent insulation and sealing properties of the coating means according to this invention.

Upon completion of the environmental tests described below, the leak tests as to the coated materials resultantly obtained as specimens by being formed on the connecting portions in the aforementioned manner were carried out after soaking the specimens in a solution of sodium bicarbonate for 24 hours and applying direct current of 50 volts to the specimens soaked in the solution, to measure resultant leak current.

Environmental Tests (a) Heat Cycle Tests:

The test was performed ten times at 80° C. for 3 hours, 25° C. for 10 minutes, −40° C. for 30 minutes and 25° C. for 10 minutes.

(b) Heat Run Tests: At 80° C. for 720 hours (c) Oil Resistance Tests:

The specimens were respectively soaked in gasoline (at 25° C.) and engine oil (at 40° C.) for 30 seconds, and then, the oil adhered to the specimens was wiped off. As a comparative specimen, a wire coated with an insulating vinyl tape was used.

Experimental Results

[TABLE 1]

|  | Heat Cycle Test | Heat Run Test | (Leak numbers/N-times) Oil Resistance Test | |
| --- | --- | --- | --- | --- |
|  |  |  | Gasoline | Engine Oil |
| Coating by This Invention (Examples 1 & 2) | 0/5 | 0/5 | 0/5 | 0/5 |
| Vinyl Tape | 5/5 | 4/5 | 5/5 | 5/5 |

As shown above, almost all of the wires coated with the vinyl tape gave rise to leakage of electric current. On the other hand, no leakage of electric current was found in the coating means according to this invention under any conditions. Thus, the excellent properties of the coating means of this invention could be proved.

Other embodiments in which coating means each comprise a container formed in a substantial shell are shown in FIG. 6 to FIG. 9. In these embodiments, reference numeral 11 denotes the container comprising two-piece divided shells 12 formed of plastic sheet of polypropylene or the like in one body by vacuum molding by way of example. The shells 12 constituting the container 11 have peripheral edges 13 and hinge portions 14 formed on the edges 13 so as to allow the container to be opened and closed.

The shells 12 further have opposite concave hollows 15 to be filled with a sealing compound of the single liquid type room temperature-moisture curing resin and a plurality of air passages 16 formed in the shells 12.

The shells 12 are further provided on their inner opposite parts with paired latch members 17 and grooves 18 formed one in either shell.

The coating means of the aforenoted structure has moisture permeable films 19 attached to the respective inner surfaces of the concave hollows 15 and is filled with a sealing compound 4 of the single liquid type room temperature-moisture curing resin. Then, connecting wires W1 and W2 of the connection members to be connected are thrust into the container through the respective grooves 18. While this state is maintained for one hour, the sealing compound is hardened due to moisture entering into the container 11 through the air passages 16, thereby to securely seal the connecting wires.

Figure 10:
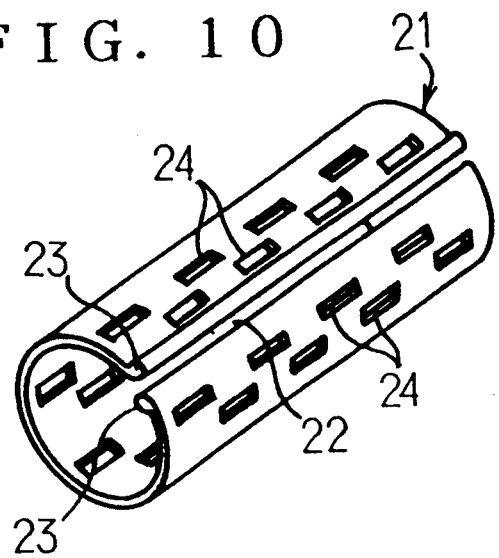
FIG. 10 is a perspective view showing still another embodiment of the coating means of this invention.
Figure 11:
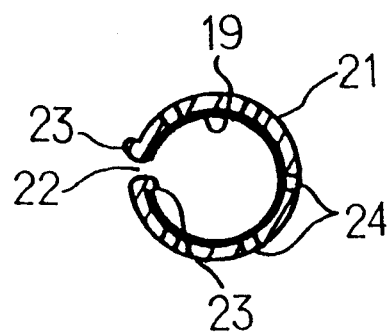
FIG. 11 is a longitudinal sectional side view showing the coating means of FIG. 10.

FIGS. 10 and 11 show still another embodiment having a cylindrical container. The container in this embodiment consists of a cylinder frame 21 formed of a plastic sheet such as of polypropylene by extrusion and having end openings. In the peripheral surface of the cylinder frame 21, there is formed a slit 22 for charging a sealing compound into the container therethrough. Along the edges defining the slit 22, a pair of hook members 23 are formed. In the peripheral surface of the cylinder frame 21, a plurality of vent slits 24 are formed. The inner surface of the cylinder frame 21 is overlaid with a moisture permeable film 19.

Figure 12:
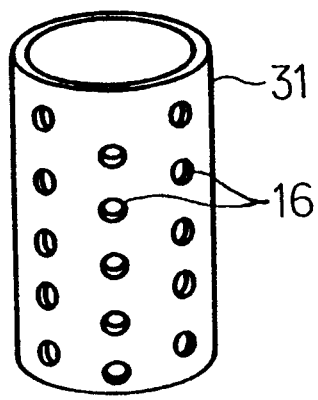
FIG. 12 is a perspective view showing yet another embodiment of the coating means of this invention, having a cylindrical container.
Figure 13:
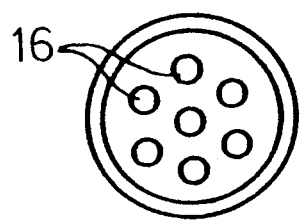
FIG. 13 is a bottom view of FIG. 12.
Figure 14:
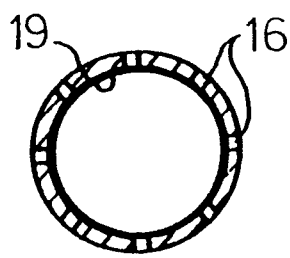
FIG. 14 is a longitudinal sectional side view of the coating means of FIG. 12.

FIGS. 12, 13 and 14 show yet another embodiment in which a cylinder frame 31 with a bottom formed of plastic sheet of polypropylene by extrusion. In the peripheral surface and bottom of the cylinder frame 31, a plurality of air passages 16 are formed. The inner surface of the cylinder frame 31 is overlaid with a moisture permeable film 19.

Figure 15:
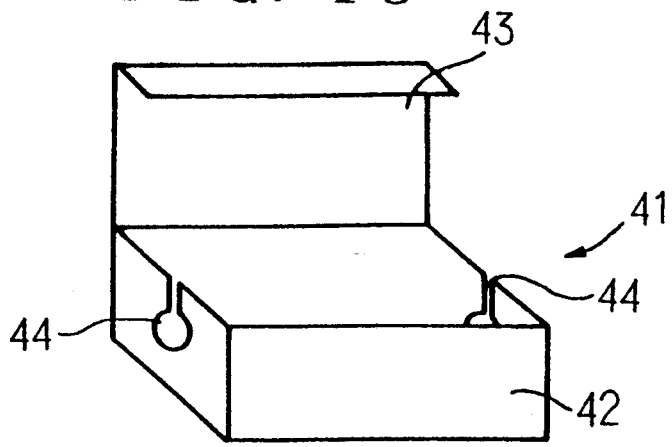
FIG. 15 is a perspective view showing a further embodiment of the coating means of this invention.
Figure 16:
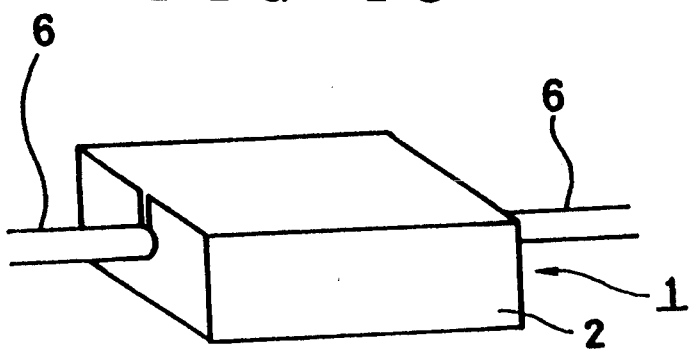
FIG. 16 is a perspective view of the coating means in use of FIG. 15.

FIGS. 15 and 16 show a further embodiment in which the coating means is constituted by a box container of permeable material. Reference numeral 41 denotes the box container being long sideways which is made of paper material having permeability to moisture such as filter paper, for example. The box container 41 has a lid member 43 extending from one side edge of a box body 42 and cut portions 44 in its opposite sides.

In this coating means, a sealing compound of one-part liquid type moisture curing resin is filled inside the box body 42. The connecting wires W1 and W2 of connection members to be connected are respectively inserted into the box body 42 through the cut portions 44. While this container is maintained for a fixed period of time in the state of closing the box body 42 with the lid member 43, environmental moisture is permitted to enter into the box body 42 through the side wall of the box body 42 made of moisture permeable paper material. Consequently, the sealing compound within the container is hardened to seal the connecting wires securely.

Figure 17:
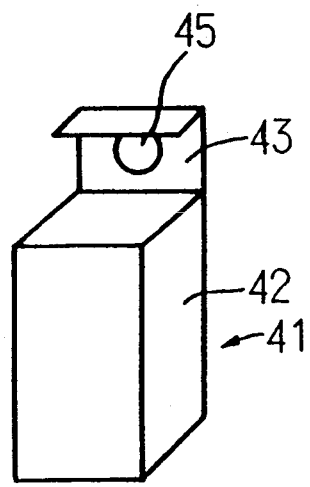
FIG. 17 is a perspective view showing the other embodiment of the coating means of this invention.
Figure 18:
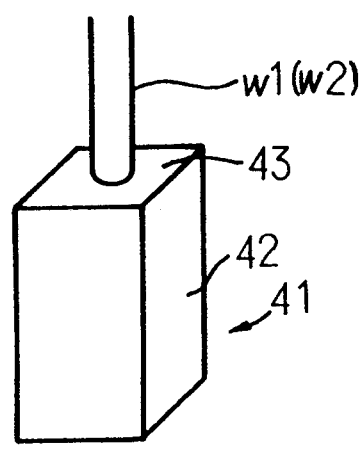
FIG. 18 is a perspective view showing the coating means of FIG. 17 in use.

FIG. 17 and FIG. 18 show the other embodiment in which the coating means is constituted by a tall box container 41 formed of moisture permeable paper material such as filter paper and having a box body 42 with a lid member 43 similarly to the preceding embodiment. The lid member 43 in this embodiment is provided at its center with an insertion hole 45.

In this embodiment, the box body 42 is filled with a sealing compound of the single liquid type moisture curing resin. The terminal portions of connection members are inserted into the container through the hole 43 formed in the upper lid member 43. When leaving the box body with holding the terminal portions inserted thereinto for a certain period of time, the connection members W1 and W2 are sealed within the container 41.

As is apparent from the foregoing, by using the coating means according to the present invention, the work of coating the connecting portions of connection members such as electric wires can be fulfilled with considerable ease. Besides, the connection members can be tightly sealed with retaining excellent antiweatherability, stability in electrical characteristics and insulation properties without using a common coating tool. The sealing of the connection members can be readily carried out even after distributing wires.

As many apparently widely different embodiments of this invention may be made without departing from the spirit and scope thereof, it is to be understood that the invention is not limited to the specific embodiments thereof except as defined in the appended claims.

What is claimed is:

1. Coating means for coating connected terminal portions of connection members, comprising:
    a plastic container formed of a material which does not allow moisture to permeate therethrough, said plastic container having at least one wall member with air passages in the form of one of vent holes, slits and mesh holes;
    an inner wall surface of said plastic container overlaid with a moisture-permeable non-woven fabric defining a filling chamber;
    a single liquid type moisture curing silicone resin serving as a sealing compound contained in said filling chamber; and
    a moisture-proof film enveloping said container to prevent moisture from passing through said air passages.

2. The coating means of claim 1, wherein said plastic container has a cylindrical shape.

3. The coating means of claim 1, further including a slit formed in said plastic container and extending along a longitudinal portion of said plastic container.

4. The coating means of claim 3, wherein a pair of hook members are provided extending along a respective pair of edges of said slit.

5. A coating assembly for coating connected terminal portions of members comprising:
    a container having at least one wall member with air passages formed therein;
    a moisture permeable material disposed along at least a portion of said wall member such that said moisture permeable material covers said air passages;
    a moisture curing resin disposed inside of said container; and
    a moisture impervious film enveloping said container to prevent moisture from passing through said air passages.

* * * * *